United States Patent
Radovic et al.

(10) Patent No.: US 8,806,145 B2
(45) Date of Patent: Aug. 12, 2014

(54) METHODS AND APPARATUSES FOR IMPROVING SPECULATION SUCCESS IN PROCESSORS (75) Inventors: Zoran Radovic, San Jose, CA (US); Erik Martin Roland Karlsson, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 984 days.

(21) Appl. No.: 12/266,719

(22) Filed: Nov. 7, 2008

(65) Prior Publication Data
US 2010/0122036 A1 May 13, 2010

(51) Int. Cl.
G06F 12/00 (2006.01)

(52) U.S. Cl.
USPC .... 711/145; 711/118; 711/137; 711/E12.017; 711/E12.057

(58) Field of Classification Search
None
See application file for complete search history.

(56) References Cited

U.S. PATENT DOCUMENTS

| | | | |
|---|---|---|---|
| 5,887,166 A * | 3/1999 | Mallick et al. | 718/102 |
| 5,974,507 A * | 10/1999 | Arimilli et al. | 711/159 |
| 6,282,617 B1 * | 8/2001 | Tirumala et al. | 711/133 |
| 6,408,364 B1 * | 6/2002 | Tan et al. | 711/136 |
| 6,523,092 B1 * | 2/2003 | Fanning | 711/134 |
| 6,594,728 B1 * | 7/2003 | Yeager | 711/128 |
| 6,718,839 B2 | 4/2004 | Chaudhry et al. | |
| 6,825,848 B1 * | 11/2004 | Fu et al. | 345/557 |
| 7,225,299 B1 * | 5/2007 | Rozas et al. | 711/144 |
| 7,721,048 B1 * | 5/2010 | Sendag et al. | 711/133 |
| 2002/0144101 A1 * | 10/2002 | Wang et al. | 712/240 |
| 2002/0174304 A1 * | 11/2002 | Wang et al. | 711/144 |
| 2003/0033510 A1 * | 2/2003 | Dice | 711/141 |
| 2004/0154012 A1 * | 8/2004 | Wang et al. | 717/158 |
| 2004/0162948 A1 * | 8/2004 | Tremblay et al. | 711/163 |
| 2006/0161762 A1 * | 7/2006 | Eisen et al. | 712/233 |
| 2006/0179174 A1 * | 8/2006 | Bockhaus et al. | 710/22 |
| 2006/0200632 A1 | 9/2006 | Tremblay et al. | |
| 2007/0073693 A1 | 3/2007 | Harris et al. | |
| 2007/0094450 A1 | 4/2007 | VanderWiel | |
| 2007/0186053 A1 | 8/2007 | Chaudhry et al. | |
| 2007/0186056 A1 | 8/2007 | Saha et al. | |
| 2009/0083488 A1 * | 3/2009 | Madriles Gimeno et al. | 711/118 |
| 2009/0106538 A1 * | 4/2009 | Bishop et al. | 712/226 |
| 2010/0122038 A1 | 5/2010 | Manovit et al. | |
| 2012/0079246 A1 * | 3/2012 | Breternitz, Jr. et al. | 712/208 |

OTHER PUBLICATIONS

Al-Sukhni, Hassan Fakhri. "Identifying and Exploiting Memory Access Characteristics for Prefetching Linked Data Structures." University of Colorado, 2006.*
Non-Final Office Action, U.S. Appl. No. 12/266,753, Jul. 21, 2011.

(Continued)

Primary Examiner — Matthew Bradley
Assistant Examiner — Daniel Bernard
(74) Attorney, Agent, or Firm — Polsinelli PC (57) ABSTRACT Methods and apparatuses are disclosed for improving speculation success in processors. In some embodiments, the method may include executing a plurality of threads of program code, the plurality of threads comprising a first speculative load request, setting an indicator bit corresponding to a cache line in response to the first speculative load request, and in the event that a second speculative load request from the plurality of threads refers to a first cache line with the indicator bit set, determining if a second cache line is available.

20 Claims, 3 Drawing Sheets (56) References Cited

OTHER PUBLICATIONS

Response to Non-Final Office Action, U.S. Appl. No. 12/266,753, Oct. 21, 2011.
Final Office Action, U.S. Appl. No. 12/266,753, Jan. 20, 2012.
RCE & Response to Final Office Action, U.S. Appl. No. 12/266,753, Apr. 17, 2012.
Non-Final Office Action, U.S. Appl. No. 12/266,753, May 25, 2012.
Response to Non-Final Office Action, U.S. Appl. No. 12/266,753, Aug. 27, 2012.
Final Office Action, U.S. Appl. No. 12/266,753, Feb. 7, 2013.
RCE & Response to Final Office Action, U.S. Appl. No. 12/266,753, May 7, 2013.
U.S. Appl. No. 12/266,753, filed Nov. 7, 2008, Manovit et al.

* cited by examiner

METHODS AND APPARATUSES FOR IMPROVING SPECULATION SUCCESS IN PROCESSORS

CROSS-REFERENCE TO RELATED APPLICATIONS

This application is related to U.S. Nonprovisional patent application Ser. No. 12/266,753, entitled "Methods and Apparatuses for Improving Speculation Success in Processors," filed on the same date as the instant application and incorporated by reference as if set forth in full below.

BACKGROUND

Computers are ubiquitous in today's society. They come in all different varieties and can be found in places such as automobiles, the grocery store, banks, personal digital assistants, cell phones, as well as in many businesses. As will be appreciated by almost anyone owning a computer, there is a trend of incorporating more and more functionality into the same amount of space. This trend may be due to many factors, such as, the miniaturization and increasing density of system components with each successive generation of computer. These increases in functionality in successive generations of computers may cause inefficiencies in the way that computers operate.

One problem associated with the ever increasing functionality of computers is the disparity between the speed at which the computer's microprocessor operates versus the computer's memory access speed. Because of this disparity, computer's with high speed microprocessors may spend a large amount of time waiting for memory references to complete instead of performing computational operations. Some microprocessors attempt to overcome this disparity by implementing multi-threading. With proper hardware support, multi-threading can dramatically increase the performance of applications. However, as microprocessor performance continues to increase, the time spent synchronizing threads may become a large fraction of overall execution time. These synchronization efforts include locking data being accessed by one thread, so that other threads cannot manipulate data in use by another thread. As the number of threads increases, so does the overhead associated with implementing data locking, so it may be desirable to maximize the performance of each thread so that the number of threads requiring synchronization may be minimized.

To improve the performance of each thread, "speculative" execution may be implemented on one or more sections of the code prior to its occurrence in the program order, i.e., executed ahead of time. In brief, speculative execution may include executing sections of code ahead of time without immediately committing the changes to the microprocessor's architectural state. The changes made during the speculative execution later may be committed to the architectural state of the microprocessor if the speculative execution completes without encountering an interfering data access from another thread. If an access occurs that does not interfere with data in use by another thread, the speculative execution may succeed and results of the speculative execution may be committed to the architectural state of the processor. On the other hand, if an access occurs that does interfere with data in use by another thread, the speculative execution may fail, resulting in the speculative execution not being committed to the architectural state of the processor. Although terminating the speculative execution in this manner may prevent threads from interfering with each other, there may be situations where this termination is not necessary. Also, terminating speculative execution may require restoring a checkpoint, which may take additional processor cycles such that the more speculation failures that occur, the more processor cycles may be used by speculative execution failure. Hence, a method and apparatus for improving speculation success in microprocessors is desired.

SUMMARY

Methods and apparatuses are disclosed for improving speculation success in processors. In some embodiments, the method may include executing a plurality of threads of program code, the plurality of threads including a first speculative load request, setting an indicator bit corresponding to a cache line in response to the first speculative load request, and in the event that a second speculative load request from the plurality of threads refers to a first cache line with the indicator bit set, determining if a second cache line is available.

In other embodiments the apparatus may include a computer system including a plurality of processing cores, each may be capable of executing at least one thread of program code, a cache coupled to the plurality of processing cores, where each cache line within the cache may further include an indicator bit, where one or more of the plurality of cores executes a first thread of the program code and a second thread of the program code out of order, and where, in the event that a load request from the second thread hits to a first cache line with the indicator bit set, the second thread may continue to execute the program code out-of-order.

Still other embodiments may include a tangible storage medium, the storage medium including instructions that may speculatively execute a first thread of a program code while a second thread of the program code is executing, determine if a speculative data access to a first cache line conflicts with a previous data access, and in the event that the speculative data access conflicts, determining a second cache line without a conflict.

BRIEF DESCRIPTION OF THE DRAWINGS

For a detailed description of the various embodiments of the invention, reference will now be made to the accompanying drawings, in which.

The use of the same reference symbols in different drawings indicates similar or identical items.

DETAILED DESCRIPTION

Speculation may allow a multi-threaded processor to execute program code out-of-order so as to minimize idle time. While conventional multi-threaded processors that implement speculation may terminate speculation when a cache conflict occurs, this cache conflict may be avoided in some cases. In some embodiments, methods and apparatuses may be provided that improve speculation success in processors by strategically replacing cache lines so as to minimize cache conflicts that may occur during speculative execution. Thus, the processor may continue to speculatively execute code out-of-order whereas a conventional cache replacement scheme may have caused the speculative execution to fail.

Figure 1:
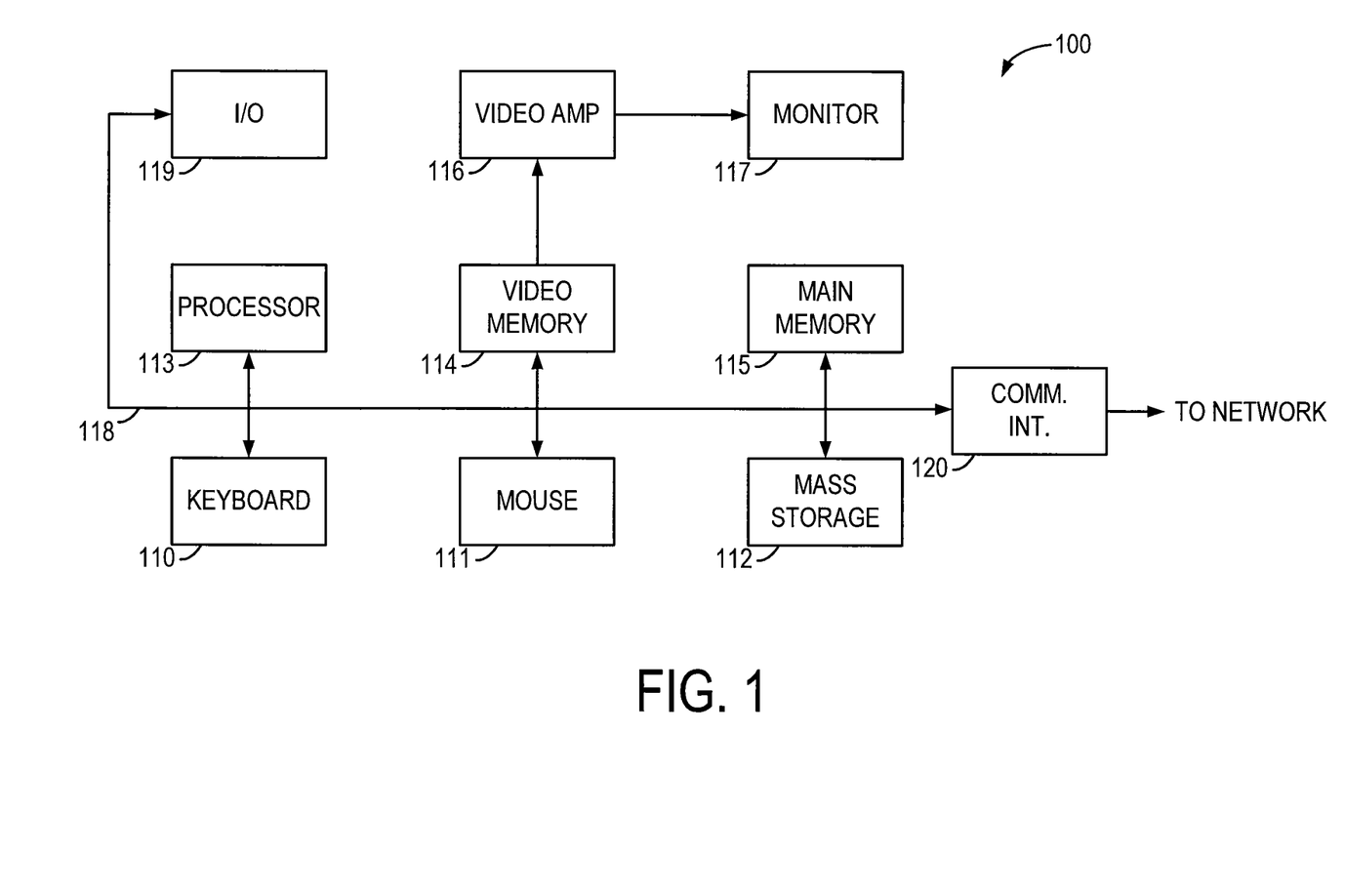
FIG. 1 illustrates an exemplary computer system.

FIG. 1 illustrates a computer system 100 capable of implementing the exemplary cache replacement scheme during speculative processor execution. In some embodiments, the computer system 100 may be an implementation of enterprise level computers, such as one or more blade-type servers within an enterprise. In other embodiments, the computer system 100 may be a personal computer and/or a handheld electronic device. A keyboard 110 and mouse 111 may be coupled to the computer system 100 via a system bus 118. The keyboard 110 and the mouse 111, in one example, may introduce user input to the computer system 100 and communicate that user input to a processor 113. Other suitable input devices may be used in addition to, or in place of, the mouse 111 and the keyboard 110. An input/output unit 119 (I/O) coupled to system bus 118 represents such I/O elements as a printer, audio/video (A/V) I/O, etc.

Computer 100 also may include a video memory 114, a main memory 115 and a mass storage 112, all coupled to the system bus 118 along with the keyboard 110, the mouse 111 and the processor 113. The mass storage 112 may include both fixed and removable media, such as magnetic, optical or magnetic optical storage systems and any other available mass storage technology. The bus 118 may contain, for example, address lines for addressing the video memory 114 or the main memory 115. In some embodiments, the main memory 115 is a fully buffered dual inline memory module (FB-DIMM) that communicates serially with other system components.

The system bus 118 also may include a data bus for transferring data between and among the components, such as the processor 113, the main memory 115, the video memory 114 and the mass storage 112. The video memory 114 may be a dual-ported video random access memory. One port of the video memory 114, in one example, is coupled to a video amplifier 116, which is used to drive a monitor 117. The monitor 117 may be any type of monitor suitable for displaying graphic images, such as a cathode ray tube monitor (CRT), flat panel, or liquid crystal display (LCD) monitor or any other suitable data presentation device.

In some embodiments, the processor 113 is a SPARC® microprocessor from Sun Microsystems, Inc, although any other suitable microprocessor or microcomputer may be utilized. The processor 113 and its cache replacement policies during speculative execution are described in more detail below with regard to FIGS. 2 and 3.

The computer system 100 also may include a communication interface 120 coupled to the bus 118. The communication interface 120 provides a two-way data communication coupling via a network link. For example, the communication interface 120 may be a local area network (LAN) card, or a cable modem, and/or wireless interface. In any such implementation, the communication interface 120 sends and receives electrical, electromagnetic or optical signals which carry digital data streams representing various types of information.

Code received by the computer system 100 may be executed by the processor 113 as it is received, and/or stored in the mass storage 112, or other non-volatile storage for later execution. In this manner, the computer system 100 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and/or solid state memory, which may be internal to one or more integrated circuits within the computer system 100.

Figure 2:
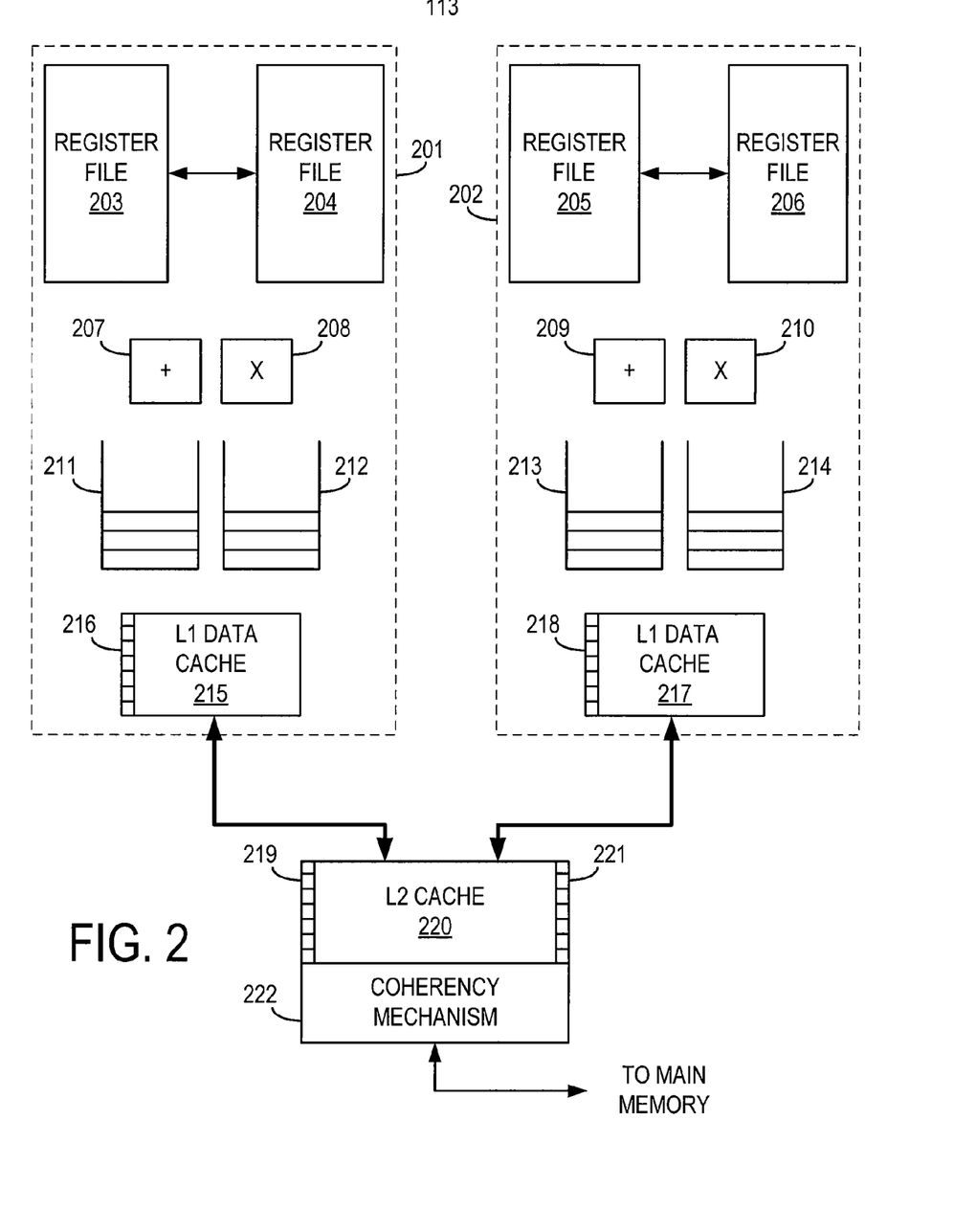
FIG. 2 illustrates an exemplary processor.

FIG. 2 illustrates an exemplary implementation of the processor 113 that may be capable of implementing one or more cache replacement policies so as to prolong speculative execution. An shown the processor 113 may include any number of processing cores such as the cores 201 and 202, which may couple to a level 2 (L2) cache 220. The L2 cache 220 may be further coupled to a main memory (not specifically shown). Although the processor 113 may include any number of cores (such as the cores 201 and 202), the cores in the processor 113 may operate in a similar manner as the core 201, and therefore, only the core 201 will be described below.

Core 201 may include a plurality of register files 203 and 204, one of which may be referred to as an "active register file" and the other of which may be referred to as a backup "shadow register file". Note that either of the register files 203 or 204 may be used as the active register file, wherein the other register may be used as the shadow register file. During speculative execution, the core 201 may perform a flash copy operation that copies all of the values from the register file 203 into the register file 204 or vice versa, wherein the active register contents may be copied to the shadow register file. By providing a flash copy operation in this manner, the processor 113 may allow snapshots or checkpoints of its operations to be taken at various times in order to support speculative execution. Note that in some embodiments, the flash copy is may not be a traditional copy, for example, in some embodiments it may be accomplished by modifying and/or changing pointers.

In other words, if the core 201 enters a speculative execution mode where it is executing program code out-of-order with respect to its program order, prior to entering this speculative execution mode, the core may provide a flash copy of the contents of the active register to the shadow register. Thus, if for some reason the speculative execution fails (e.g., cache line invalidation by core 202), the core 201 may return to the state that it was in prior to speculative execution mode.

The core 201 also may include one or more functional units, such as an adder 207 and a multiplier 208. These functional units may be used in performing computational operations involving operands retrieved from the register files 203 or 204. Although not specifically shown, any variety of arithmetic and/or logical operations may be performed by the one or more functional units. Furthermore, as will be described in more detail below, the cores 201 and 202 may share one or more of these functional units.

As the core 201 executes load and store operations, they may pass through a load buffer 211 and a store buffer 212 respectively. The load buffer 211 and store buffer 212 may couple to a level one (L1) data cache 215, which may store data items that are likely to be used by core 201 while it is executing the program code. (Although not specifically shown, the core 201 also may include an L1 instruction cache.)

Since the processor 113 may include multiple cores 201 and 202, each of which may be speculatively executing different sections of the program code at different times with different execution threads, data that is currently being loaded and/or stored by one thread may affect data that is about to be or has been loaded and/or stored by another thread. In other words, the load value in the active register may be different from that in the data caches in the processor 113. This is so because the data caches may be updated with a newer value after the active register files receive the old value from the data caches. Accordingly, in some embodiments, each cache line in the L1 data cache 215 may include one or more load-marking bits 116 that indicate a data value from any particular cache line has been loaded during speculative execution. For ease of discussion, the load-marking bits 216 will be referred to herein as the speculation bit (S-bit) and the two terms will be used interchangeably. These S-bits 216 may be used to determine whether any interfering memory references take place during speculative execution as will be described below with reference to FIG. 3. In cases where there are multiple threads sharing the same core, there may be an array of S-bits 216, where different portions of the array may be allocated to each of the multiple threads. Notably, the S-bits may be associated with numerous different granularities of data storage. Thus, although this disclosure may discuss S-bits associated with a cache line, it should be appreciated that one or more S-bits may be associated with any level of granularity within data storage, such as translation look aside buffer (TLB) pages.

Note that the load-marking may occur at any stage of memory within the processor 113, and is not exclusive to the L1 data cache 215. Thus, load-marking can take place at any level of cache, such as the L2 cache 220, or even in an independent structure. The L2 cache 220 may operate in concert with the L1 data cache 215 (and/or a corresponding L1 instruction cache) in the core 201, and with the L1 data cache 217 (and/or a corresponding L1 instruction cache) in the core 202. In some embodiments, the L2 cache 220 may be associated with a coherency mechanism 222. During operation, this coherency mechanism 222 may maintain "copyback information" 221 for each cache line. This copyback information 221 may facilitate sending a cache line from the L2 cache 220 to a requesting thread in cases where a cache line is to be sent to another thread.

As illustrated, each line in the L2 cache 220 may include one or more L2 S-bits 219 to indicate that a data value has been loaded from an L2 cache line during speculative execution. As was the case for the S-bit 216, there may be different versions of the data within different L2 data caches in the processor 113, and therefore, this L2 S-bit 219 may be used to determine whether any conflicting memory references in the L2 cache 220 take place during speculative execution. In some embodiments, each of the cores 201 and 202 may have their own separate S-bit 219 within the L2 cache 219.

The overall speed that the processor 113 executes the program code may be increased by allowing the different cores (e.g., the cores 201 and 202) to utilize their idle time by speculating as to the eventual outcome of program code in an out-of-order fashion. In some embodiments, the cores 201 and 202 may share at least some of their circuitry with each other, such as the functional units 207 and 208 or the caches 215 and 217. The term "thread", as used herein, generally refers to a core executing code while sharing components with other cores within the processor 113. Thus, the core 201 may execute a first thread or section of program code while the core 202, which may be sharing components within the processor 113 with the core 201, may execute a second thread.

Figure 3:
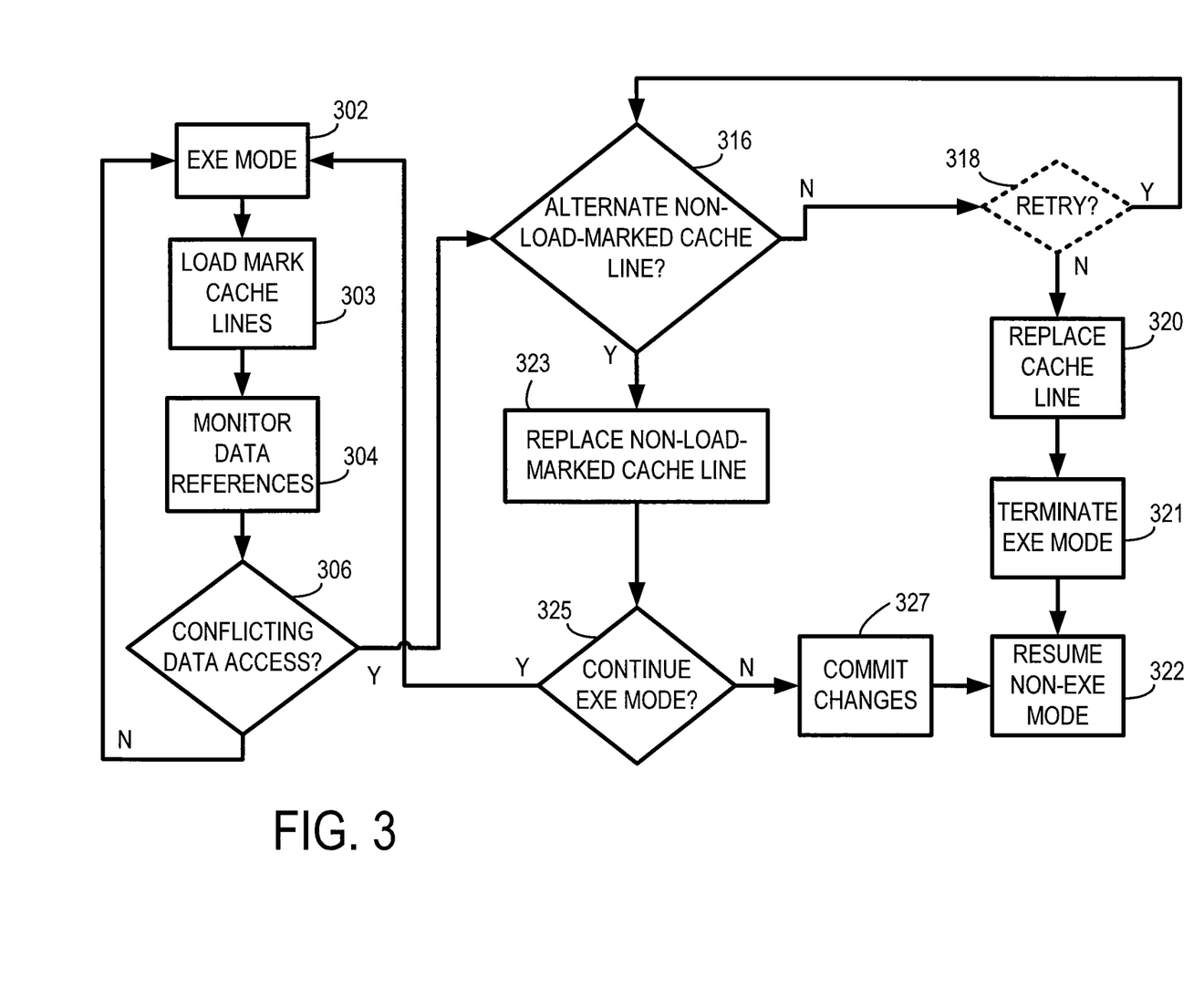
FIG. 3 illustrates a flow chart of cache replacement during speculative execution.

These threads may execute sections of program code in a speculative execution (EXE) mode as shown in FIG. 3. In block 302, a thread first may begin EXE mode on a section of code without committing results of the speculative execution. Note that this first thread may be in EXE mode while a second thread may be executing instructions from the program code in order, i.e., in non-EXE mode. In some embodiments, during EXE mode of block 302, a flash copy operation may be performed from the register file 203 to the register file 204 (shown in FIG. 2). This flash copy also may checkpoint various state registers associated with the currently executing thread. In general, the flash copy operation checkpoints enough state information to be able to restart the corresponding thread. While the register file 203 is checkpointed, the store buffer 212 may be "gated". Gating the store buffer 212 may allow existing entries in the store buffer 212 to propagate to the memory sub-system (and to thereby become committed to the architectural state of the processor 113), but may prevent new store buffer entries generated during speculative execution from doing so.

During block 303, the processor 113 may begin load-marking cache lines. That is, when performing a load operation during EXE mode, if the load causes a cache hit in the L1 data cache 215, then the processor 113 "load-marks" the corresponding cache line in L1 data cache 215 by setting the S-bit 216. Similarly, during EXE mode, if the load causes a cache hit in the L2 cache 220, then the processor 113 load-marks the corresponding cache line in the L2 cache 220 by setting the L2 S-bit 219. Setting either S-bit 216 and/or 219 may indicate that that particular cache line is being used during EXE mode.

In block 304, the processor 113 operating in EXE mode may continually monitor data references made by other threads and determine if the threads are trying to conflict with cache lines that have their S-bits 216 and/or 219 set. In some cases, a conflicting data access may be a store to a cache line that has already been load-marked by another thread. For example, if a first thread that is speculatively loading data from the L1 data cache 215, it may set the S-bit 216. In this example, if a second thread successfully stores to this same cache line—i.e., effectively evicting a cache line with the S-bit 215 set—this may create a conflicting data access that causes the EXE mode to fail because the data read by the first thread may no longer conform with in-order execution of the program. Notably, the thread causing the data conflict may include both a speculatively executing thread as well as the non-EXE mode thread. Further the thread causing the data conflict may be executing in a remote part of the system.

Conventionally, if a conflicting data access was detected during EXE mode, the processor 113 would discard changes made during the speculative execution and not commit the changes made during EXE mode to the architectural state of the processor 113. In other words, the speculative execution would fail and the processor 113 may not receive the benefit from out-of-order execution. Note that as the overall number of threads sharing a cache increases, the likelihood that the processor 113 may fail speculative execution increases.

According to at least some embodiments, if there is a conflicting data access (per block 306), speculative execution may be prolonged by implementing policies that prevent cache line replacement for cache lines with their S-bits set. For example, if the cache line that is to be replaced is load-marked, i.e. a conflicting data access per block 306, then a determination may be made (in block 316) as to whether an alternative non-load-marked cache line is available. During block 316, one or more cache replacement schemes may be implemented to determine if an alternative non-load-marked cache line (which does not have its S-bit set), exists. One exemplary cache replacement scheme for determining an alternative non-load-marked cache line may include determining which of the non-load-marked cache lines has the oldest data in it, e.g., by implementing a least recently used (LRU) scheme. Other embodiments may include randomly selecting another cache line address from the non-load-marked cache lines in the L1 cache 215 and/or the L2 cache 220.

In some embodiments, in the event that the determination of block 316 yields no alternative non-load-marked cache line exists, then the determination of block 316 may be optionally retried a predetermined number of times as shown in block 318. Once the predetermined number of retries have expired, or in the event that the predetermined number of retries is configured to be zero, then the processor 113 may implement a scheme (e.g., LRU) to select a replacement cache line from among non-load-marked and load-marked cache lines per block 320. Thus, in the event that block 316 yields no alternative non-load-marked cache line exists, the processor 113 may risk that the cache line that it is replacing is load-marked, which may cause speculative execution to fail as shown in block 321.

In some embodiments, in the event that the determination of block 316 yields no alternative non-load-marked cache line exists, instead of attempting to find an alternative cache line a predetermined number of times (per block 318), a predetermined offset from the cache address may be calculated as a replacement cache line. Regardless of the scheme used to find a replacement cache line, if the replacement cache line that is being evicted has its S-bit set, this may cause the processor 113 to terminate speculative execution for the offending thread as shown in block 321 and may resume in-order execution of program code per block 322 (i.e., non-EXE mode).

If, however, the determination of block 316 yields an alternative non-load-marked cache line, then in block 323 the processor 113 may replace the alternative cache line without causing the speculative execution to fail. In other words, according to some embodiments, data that is used during speculative execution may be given priority over data that is not used during speculative execution by implementing certain cache replacement and eviction schemes. This may allow the speculative execution to continue whereas conventional systems may have previously terminated speculative execution.

In the event that continued operation in EXE mode is desired—e.g., the thread has additional instructions to speculatively execute—then control may flow from block 323 through block 325 and back to block 302. On the other hand, in the event that speculative execution terminates normally, the processor 113 may atomically commit all changes made during EXE mode to the architectural state of the computer system 100, per block 327, and then may resume in-order execution of program code per block 322.

The above discussion is meant to be illustrative of the principles and various embodiments of the present invention. Numerous variations and modifications will become apparent once the above disclosure is fully appreciated. For example, in some embodiments, the disclosed principles equally apply to transactional memory systems (hardware and/or software) that may implement sequential blocks of code instead of using data locks. Each sequential block of code may include one or more S-bits. As these blocks of code are executed, it may be determined whether a data location with its S-bit set was to be replaced, and if so, the aforementioned replacement schemes may be implemented. Furthermore, at least some of the embodiments may be stored on a computer readable storage medium, which may be any device or medium that can store code and/or data for use by a computer system. This may include, but is not limited to, magnetic and optical storage devices such as disk drives, magnetic tape, compact discs (CDs) and digital video discs (DVDs), and computer instruction signals embodied in a transmission medium, such as the Internet. The claims should be interpreted to include any and all such variations and modifications. In addition, the above description has broad application, and the discussion of any embodiment is meant only to be exemplary, and is not intended to intimate that the scope of the disclosure, including the claims, is limited to these embodiments.

We claim:

1. A method of executing instructions in a computer system, the method comprising the acts of:
increasing an overall processing speed of at least one processor core by utilizing idle time of the at least one processor core to perform speculative execution on a program code by:
executing, using the at least one processor core, a plurality of threads of program code, the plurality of threads comprising a first speculative load request;
setting a first indicator bit corresponding to a first cache line in response to the first speculative load request;
in the event that a second speculative load request from the plurality of threads refers to the first cache line with the first indicator bit set, executing a first cache replacement scheme to determine if a second cache line is available that does not have a second indicator bit set, the second indicator bit corresponding to the second cache line;
in the event that the second cache line is not available, reattempting to identify the second cache line for a number of times; and
after the number of times, executing a second cache replacement scheme to determine if a third cache line is available.

2. The method of claim 1, wherein at least one of the plurality of threads is executing the program code in an out-of-order fashion and wherein at least one of the plurality of threads is executing the program code in order.

3. The method of claim 1, further comprising providing a flash copy of a first register to a second register, the first register and second register located within the processor core.

4. The method of claim 1, wherein the act of determining if a second cache line is available further comprises the act of determining an oldest cache line in a cache that does not have an indicator bit set.

5. The method of claim 1, wherein the act of determining if a second cache line is available further comprises the act of randomly choosing a cache line that does not have an indicator bit set.

6. The method of claim 1, further comprising the act of evicting the second cache line.

7. The method of claim 1, wherein the act of determining if a second cache line is available is repeated until an alternative cache line is identified that does not have an indicator bit set.

8. The method of claim 1, further comprising the act of committing at least one change made during speculative execution.

9. The method of claim 1, wherein in the event that the second cache line is not available, the method further comprises the act of evicting the first cache line.

10. The method of claim 1, wherein in the event that the second cache line is not available, the method further comprises the act of evicting an alternate cache line that is located a predetermined offset from the first cache line.

11. The method of claim 1, wherein at least one cache line is shared between the plurality of threads.

12. A computer system comprising:
a plurality of processing cores, each capable of executing at least one thread of program code;
a cache coupled to the plurality of processing cores, wherein each cache line within the cache further comprises an indicator bit;
increasing an overall processing speed of one or more of the plurality of processor cores by utilizing idle time of the one or more of the plurality of processing cores to perform speculative execution on a program code by:

executing a first thread of the program code and a second thread of the program code out of order;

in the event that a load request from the second thread hits to a first cache line with a first indicator bit set, the one or more of the plurality of processing cores executes a first cache replacement scheme to determine if a second cache line is available that does not have a second indicator bit set and wherein the second thread continues to execute the program code out-of-order;

in the event that the second cache line is not available, reattempting to identify the second cache line for a number of times; and after the number of times, executing a second cache replacement scheme to determine if a third cache line is available.

13. The computer system of claim 12, wherein the second cache line is an oldest cache line in the cache.

14. The computer system of claim 12, wherein the second cache line randomly chooses a cache line that does not have an indicator bit set.

15. The computer system of claim 12, wherein the second cache line is evicted.

16. The computer system of claim 12, wherein at least one change resulting from out-of-order execution of the program code is committed.

17. The computer system of claim 12, wherein the cache is shared between the first thread and the second thread.

18. A non-transitory tangible storage medium comprising instructions capable of being executed by a computer system, the instructions comprising the acts of:

increasing an overall processing speed of at least one processor core by utilizing idle time of the at least one processor core to perform speculative execution on a program code by:

speculatively executing a first thread of the program code while a second thread of the program code is executing; and in the event that the speculative data access conflicts, executing a first cache replacement scheme to determine a second cache line without a conflict by:

determining if an indicator bit corresponding to the second cache line is not set;

in the event that the second cache line is not available, reattemptinq to identify the second cache line for a number of times; and after the number of times, executing a second cache replacement scheme to determine if a third cache line is available.

19. The tangible storage medium of claim 18, wherein the instructions further comprise the act of continuing speculative execution of the first thread of the program code.

20. The tangible storage medium of claim 19, wherein the act of determining if the second cache line further comprises the act of determining an oldest cache line in a cache that does not have an indicator bit set.

* * * * *

UNITED STATES PATENT AND TRADEMARK OFFICE
CERTIFICATE OF CORRECTION

PATENT NO.        : 8,806,145 B2                                       Page 1 of 1
APPLICATION NO.   : 12/266719
DATED             : August 12, 2014
INVENTOR(S)       : Radovic et al.

It is certified that error appears in the above-identified patent and that said Letters Patent is hereby corrected as shown below:

In the Specification
In column 6, line 17, delete "that that" and insert -- that --, therefor.

In the Claims
In column 10, line 16, in Claim 18, delete "reattemptinq" and insert -- reattempting --, therefor.

Signed and Sealed this
Third Day of March, 2015

Michelle K. Lee
*Deputy Director of the United States Patent and Trademark Office*